United States Patent
Anderson et al.

(10) Patent No.: US 10,115,396 B2
(45) Date of Patent: Oct. 30, 2018

(54) CONTENT STREAMING SYSTEM

(71) Applicant: Logitech Europe S.A, Lausanne (CH)

(72) Inventors: Jeffrey Anderson, Camas, WA (US); Eric Andre Tissot-Dupont, San Francisco, CA (US); Patrick Nicolet, Mountain View, CA (US)

(73) Assignee: LOGITECH EUROPE, S.A., Lausanne (CH)

( * ) Notice: Subject to any disclaimer, the term of this patent is extended or adjusted under 35 U.S.C. 154(b) by 0 days.

(21) Appl. No.: 15/397,358

(22) Filed: Jan. 3, 2017

(65) Prior Publication Data
US 2018/0190279 A1 Jul. 5, 2018

(51) Int. Cl.
| | |
|---|---|
| G06F 15/16 | (2006.01) |
| H04L 12/00 | (2006.01) |
| H04L 29/00 | (2006.01) |
| G06F 21/00 | (2013.01) |
| G09G 5/12 | (2006.01) |
| G10L 15/22 | (2006.01) |
| H04L 29/06 | (2006.01) |
| H04W 84/04 | (2009.01) |

(Continued)

(52) U.S. Cl.
CPC .......... *G10L 15/22* (2013.01); *G10L 15/1822* (2013.01); *G10L 15/30* (2013.01); *H04L 65/4084* (2013.01); *H04L 67/06* (2013.01); *H04L 67/125* (2013.01); *H04W 84/042* (2013.01); *G10L 2015/088* (2013.01); *G10L 2015/223* (2013.01)

(58) Field of Classification Search
CPC ..... G10L 15/22; G10L 15/1822; G10L 15/30; G10L 2015/088; G10L 2015/223; H04L 65/4084; H04L 67/06; H04W 84/042
See application file for complete search history.

(56) References Cited

U.S. PATENT DOCUMENTS

| | | |
|---|---|---|
| 5,434,617 A | 7/1995 | Bianchi |
| 6,392,694 B1 | 5/2002 | Bianchi |

(Continued)

OTHER PUBLICATIONS

Eileen Burbidge et al. "Google Introduces New Open Format and Developer Tools for Working with BLE Beacons", Disrupt London. https://techcrunch.com/2015/07/14/google-introduces-open-format-and-developer-tools-for-bluetooth-le-beacons/.

(Continued)

*Primary Examiner* — Fariba Sirjani
(74) *Attorney, Agent, or Firm* — Patterson & Sheridan, LLP

(57) ABSTRACT

A method of downloading media content to a content player is provided, including receiving a command at a content player to deliver media content; transmitting the command from the content player to a first server; determining that the command is a request to deliver media content from a content provider; transmitting a request to a content server of the content provider from the first server based on the determined request to deliver the media content from the content provider; receiving, at the first server, a first information link from the content server in response to the request; transmitting the first information link to the content player; downloading a first portion of a media file to the content player from the content server using the first information link; and delivering at least a portion of the media file to the user.

25 Claims, 7 Drawing Sheets

(51) Int. Cl.
*H04L 29/08* (2006.01)
*G10L 15/18* (2013.01)
*G10L 15/30* (2013.01)
*G10L 15/08* (2006.01)

(56) References Cited

U.S. PATENT DOCUMENTS

| | | | |
|---|---|---|---|
| 6,611,281 B2 | 8/2003 | Strubbe | |
| 6,731,334 B1 | 5/2004 | Maeng et al. | |
| 6,829,391 B2 | 12/2004 | Comaniciu et al. | |
| 7,133,513 B1* | 11/2006 | Zhang | H04M 3/42221 |
| | | | 379/202.01 |
| 7,349,008 B2 | 3/2008 | Rui et al. | |
| 7,433,327 B2 | 10/2008 | Harville et al. | |
| 8,094,193 B2 | 1/2012 | Peterson et al. | |
| 8,284,254 B2 | 10/2012 | Romanowich et al. | |
| 8,358,328 B2 | 1/2013 | Friel et al. | |
| 8,471,889 B1 | 6/2013 | Lee et al. | |
| 8,547,414 B2 | 10/2013 | Sheeley | |
| 8,780,168 B2 | 7/2014 | Corley et al. | |
| 8,842,161 B2 | 9/2014 | Feng et al. | |
| 8,872,882 B2 | 10/2014 | Shanmukhadas et al. | |
| 8,885,057 B2 | 11/2014 | Mock | |
| 8,913,103 B1 | 12/2014 | Sargin et al. | |
| 9,001,183 B2 | 4/2015 | Mauchly | |
| 9,237,307 B1 | 1/2016 | Vendrow | |
| 9,270,941 B1 | 2/2016 | Lavelle | |
| 9,763,029 B2* | 9/2017 | Mirza | H04W 4/008 |
| 2004/0003409 A1 | 1/2004 | Berstis | |
| 2006/0095339 A1* | 5/2006 | Hayashi | G06Q 30/06 |
| | | | 705/26.8 |
| 2011/0055256 A1* | 3/2011 | Phillips | G10L 15/30 |
| | | | 707/769 |
| 2011/0128350 A1 | 6/2011 | Oliver et al. | |
| 2013/0007499 A1* | 1/2013 | Moy | G06F 3/1423 |
| | | | 713/400 |
| 2013/0174223 A1* | 7/2013 | Dykeman | G06F 21/10 |
| | | | 726/4 |
| 2013/0335508 A1 | 12/2013 | Mauchly | |
| 2014/0012990 A1* | 1/2014 | Ko | H04L 63/168 |
| | | | 709/226 |
| 2014/0111600 A1 | 4/2014 | Schaefer et al. | |
| 2014/0213227 A1* | 7/2014 | Rao | H04W 4/21 |
| | | | 455/414.3 |
| 2015/0022636 A1 | 1/2015 | Savransky | |
| 2015/0254435 A1* | 9/2015 | Fells | G06F 21/10 |
| | | | 726/28 |
| 2016/0291861 A1 | 10/2016 | Song et al. | |
| 2017/0041376 A1* | 2/2017 | Lin | H04L 67/06 |
| 2017/0244643 A1* | 8/2017 | Lawrence | H04L 41/0896 |
| 2017/0353907 A1* | 12/2017 | Beattie, Jr. | H04W 24/02 |
| 2018/0077592 A1* | 3/2018 | Kim | H04W 24/08 |

OTHER PUBLICATIONS

Patently Apple. Apr. 13, 2014.http://www.patentlyapple.com/patently-apple/2014/04/when-it-comes-to-ibeacon-readiness-ios-7-idevices-score-87-vs-android-devices-at-a-paltry-25.html.

Wojciech Borowicz et al. "Building Apps in the Age of Beacons and Internet of Things", Mar. 11, 2015. https://uxmag.com/articles/building-apps-in-the-age-of-beacons-and-internet-of-things.

Sarah Perez. Robin, A Company Enabling Sensor-Powered Smart Offices, Raises $1.4 Million. Jul. 7, 2014. https://techcrunch.com/2014/07/07/robin-a-company-enabling-sensor-powered-smart-offices-raises-1-35-million/.

Ron Amadeo, "Meet Google's "Eddystone"—A Flexible, Open Source iBeacon Fighter". Jul. 14, 2015. http://arstechnica.com/gadgets/2015/07/meet-googles-eddystone-a-flexible-open-source-ibeacon-fighter/.

* cited by examiner

CONTENT STREAMING SYSTEM

BACKGROUND

Field

Embodiments of the present disclosure generally relate to streaming digital media content to one or more content players.

DESCRIPTION OF THE RELATED ART

Users often stream digital media content through their portable electronic devices (e.g., smart phones) to external content players (e.g., external speakers or video players) that provide an enhanced user experience relative to watching and/or listening to the media content on the user's portable electronic device. To stream the media content to the content player from a content provider (e.g., Netflix®, Pandora®, etc.) through the portable electronic device, a native application is typically installed on the portable electronic device for each content provider. To use a given native application, the user generally must first locate the application on the user interface of the portable electronic device and then activate the desired native application by using an input device (e.g., mouse, stylus, keyboard) or by touching a touch-sensitive user interface, which can become a time-consuming process as multiple native applications are installed on the portable electronic device. Installing a native application for each content provider on a portable electronic device can be burdensome for a user. Moreover, if the user streams media content from multiple portable electronic devices, then installing a native application for each content provider on each of these portable electronic devices, some of which may run on different operating systems, can be time consuming and even more burdensome for a user.

Furthermore, while the ability to stream content to external content players through a portable electronic device offers a convenience for the user, this convenience often comes with limitations. For example, a user may be prevented from using other functionalities of portable electronic device while enjoying uninterrupted streaming of the media content. Furthermore, it is common for the streaming of media content to the external content player to be interrupted when the portable electronic device is used to make a phone call or take a picture. Also, the streaming of media content can also be interrupted when the connection to the Internet is lost or the internet connection type switches from one to another type, such as from a Wi-Fi Internet connection to a cellular Internet connection.

Therefore, there is a need for a method and related system that overcomes the deficiencies of streaming digital media content described above.

SUMMARY

Embodiments of the present disclosure generally relate to an apparatus and methods for automatically streaming digital media content to one or more content players. The apparatus and methods disclosed herein will improve a user's experience when streaming media to a content player by including features that prevent interruptions to the streaming process and simplifying the process of selecting and streaming media content from one or more content providers.

In one embodiment, a method of downloading media content to one or more content players is provided. The method includes receiving a first command at a first content player to deliver media content to a user of the first content player; transmitting at least a portion of the first command from the first content player to a first server; determining, at the first server that the at least a portion of the first command is a request to deliver media content from a first content provider; transmitting a first request to a first content server of the first content provider from the first server based on the determined request to deliver the media content from the first content provider; receiving, at the first server, a first information link from the first content server in response to the first request; transmitting the first information link, from the first server to the first content player; downloading a first portion of a first media file to the first content player from the first content server using the first information link; and delivering at least a portion of the first media file to the user.

In another embodiment, a method of downloading media content to one or more content players is provided. The method includes receiving a first command at a first content player to deliver media content to a user of the first content player; transmitting at least a portion of the first command from the first content player to a first server through a portable electronic device; determining, at the first server, that the at least a portion of the first command is a request to play media content from a first content provider; transmitting a first request to a first content server of the first content provider from the first server based on the determined request to deliver the media content from the first content provider; receiving, at the first server, a first information link from the first content server at the first server in response to the first request; transmitting the first information link from the first server to the portable electronic device; downloading a first portion of a first media file to the first content player from the first content server using the first information link, wherein the first portion of the first media file is downloaded through the portable electronic device; and delivering at least a portion of the first media file to the user.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
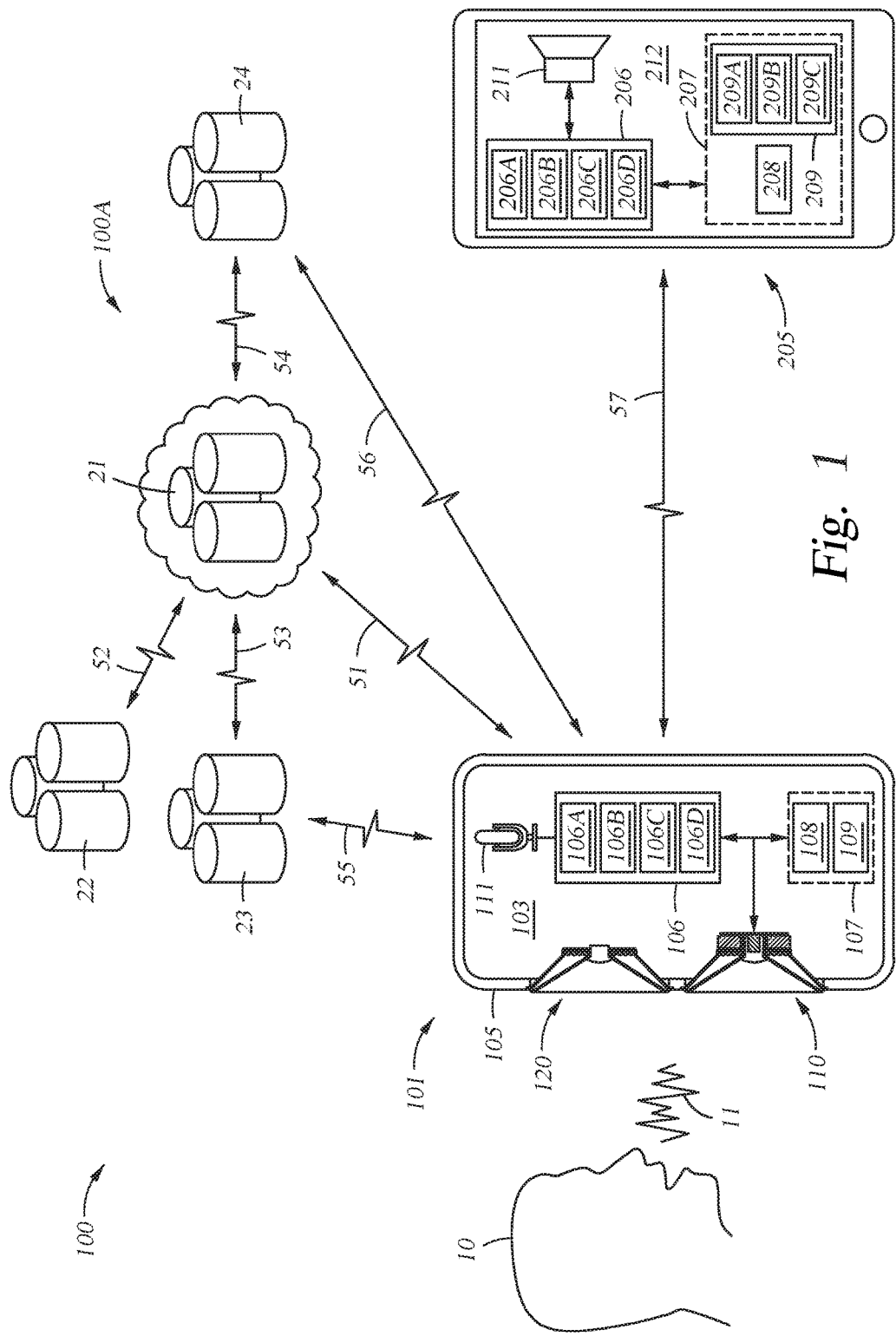
FIG. 1 is a block diagram of a user interacting with a first configuration of a content distribution system, according to one embodiment.
Figure 2:
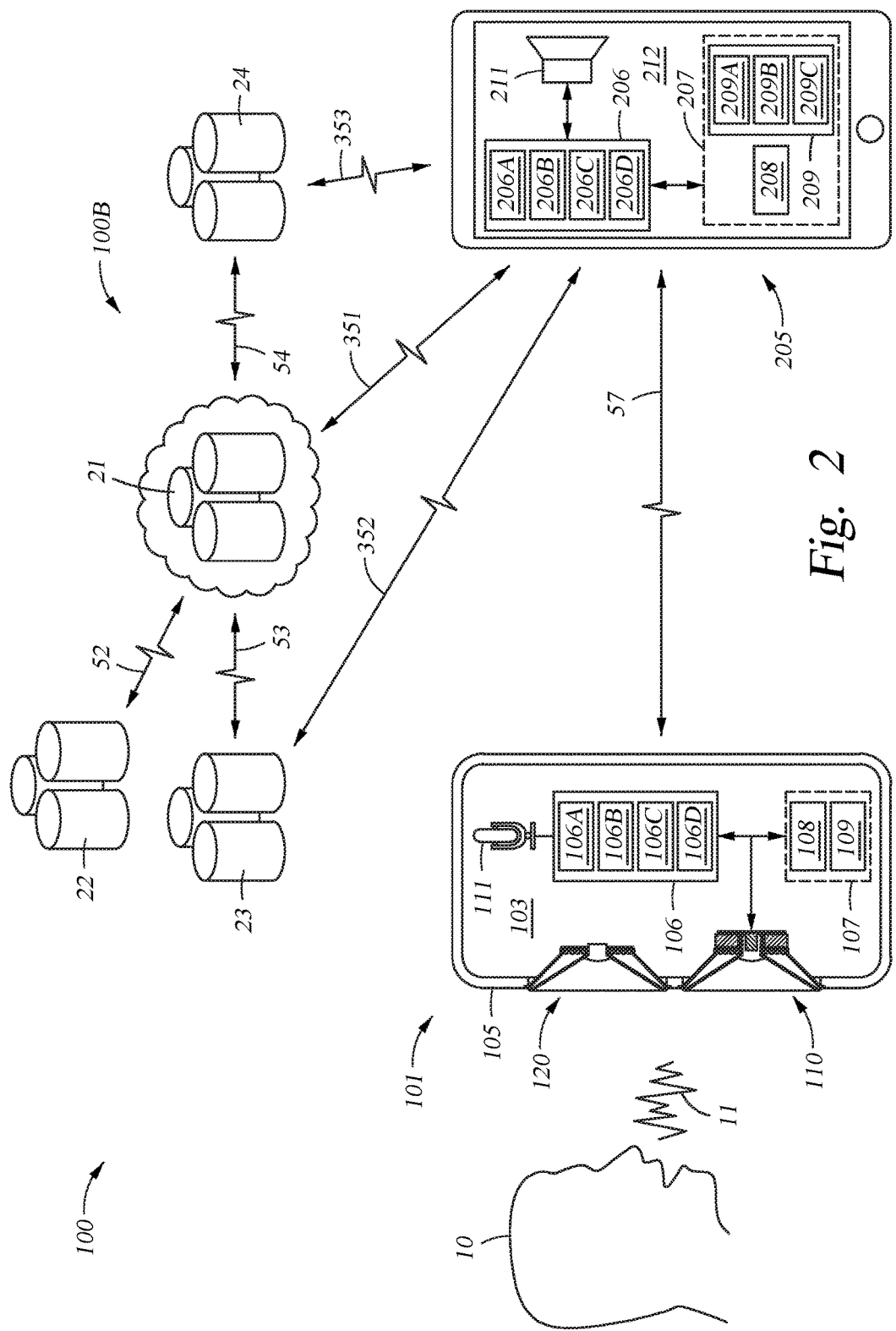
FIG. 2 is a block diagram of the user interacting with a second configuration of the content distribution system, according to one embodiment.

Embodiments of the present disclosure generally relate to streaming digital media content to a content player. The embodiments disclosed herein improve a user's experience when streaming media to a content player by including features to prevent interruptions to the streaming process and simplifying the process of selecting and streaming media content from one or more content providers. FIGS. 1 and 2 include two different configurations 100A, 1006 of a content distribution system 100, which a user may use to stream media content to a content player, such as an audio speaker 101. In the first configuration 100A, the media content can be streamed from a content provider (e.g., Pandora® and Spotify®) to the audio speaker 101 without the use of a portable electronic device 205 while in the second configuration 1006, the media content can be streamed to the audio speaker 101 through the portable electronic device 205. Therefore, in an effort to improve the user experience and allow the user to receive uninterrupted streamed media content the content distribution system 100 is adapted to automatically switch between the two configurations 100A, 100B based on available Internet connections. In both configurations 100A, 1006, a first server 21 can be used to initiate and/or coordinate the streaming of the media content from a plurality of content providers (e.g., Pandora® and Spotify®) instead of a native application (i.e., an application for a specific content provider, such as Pandora®) installed on the portable electronic device 205 or the audio speaker 101.

First Configuration

FIG. 1 is a block diagram of a user 10 interacting with a first configuration 100A of a content distribution system 100, according to one embodiment disclosed herein. The first configuration 100A of the content distribution system 100 includes an audio speaker 101 (content player), a portable electronic device 205, a first server 21, a speech recognition server 22, a first content server 23, and a second content server 24. The speech recognition server can be an Internet accessible speech recognition server of a speech recognition provider (e.g., Nuance®). Each content server 23, 24 can be an Internet accessible server of a different content provider (e.g., Pandora® or Spotify®). Although two content servers 23, 24 are shown, the first configuration 100A of the content distribution system 100 could be expanded to include more than two content servers, such as ten content servers or twenty content servers, etc. The user 10 can interact with the first configuration 100A of the content distribution system 100 to initiate the streaming of media content to the audio speaker 101 from either the first content server 23 or the second content server 24. For example, the user 10 may use a voice command 11 that is received by and at least partially analyzed by the audio speaker 101. The audio speaker 101 may then communicate with one or more of the first server 21, the speech recognition server 22, the first content server 23, and/or the second content server 24, so that the desired media content can be streamed to the audio speaker 101.

In some embodiments, a simpler configuration of the content distribution system 100 may include only the audio speaker 101, the first server 21, and the first content server 23. For example, some of the benefits of the embodiments described herein may be accomplished without including the portable electronic device 205, the speech recognition server 22, and/or the second content server 24. For example, the audio speaker 101 can stream media content from the first content server 23 of a first content provider (e.g., Pandora® or Spotify®) by having the user 10 provide a voice command 11 to the audio speaker 101 and having the first server 21 and the first content server 23 communicate with each other in order to determine the appropriate media content to stream to the audio speaker 101 based on the received voice command 11.

The servers 21-24 may each be an Internet accessible server. The first server 21 can act as a hub passing information between the audio speaker 101 and one or more of the speech recognition server 22 and the content servers 23, 24 to at least initiate the streaming of media content to the audio speaker 101. Similarly, in the second configuration 100B described below in reference to FIG. 2, the first server 21 can act as a hub between the portable electronic device 205 and one or more of the speech recognition server 22 and the content servers 23, 24. Furthermore, the first server 21 can assist with determining what media content to provide to the audio speaker 101. For example, the first server 21 can recognize which content provider (e.g., Pandora® or Spotify®) the user 10 is requesting media content from for streaming, such as by using speech recognition software to convert the voice command 11 into text and parsing the content provider's name from the other converted text. The first server 21 can further include software for contacting a plurality of content providers to initiate the streaming of the media content. For example, the first server 21 can store the user's account information (e.g., username and password) for each of the content providers that the user 10 intends to receive the stream media content from or for other content players that the user 10 may decide to stream media content from. Furthermore, in some embodiments, the first server 21 can determine which information link (e.g., a URL or URI) received from or relating to the corresponding content server 23, 24 to send to the audio speaker 101 based on the voice command 11.

The audio speaker 101 can be connected to the first server 21 through a first network connection 51 (e.g., an Internet connection). The first network connection 51 is a network connection between a first transceiver 106C of the audio speaker 101 and the first server 21. The first server 21 can act as intermediary (e.g., a hub) to initiate communication between the audio speaker 101 and one or more of the content servers 23, 24. Furthermore, in some embodiments, the first server 21 can transmit recorded speech received from the audio speaker 101 to the speech recognition server 22 through a second network connection 52 (e.g., an Internet connection or a local area network connection) to enable the speech to be converted to text by the speech recognition server 22. In some embodiments, the speech recognition server 22 can parse the converted text into categories relevant to the content provider for which the media content was requested. Thus, one of the categories in which the parsed text can be placed will include a request for a preferred content provider. For example, if the requested media is from Pandora®, then the speech recognition server 22 can place different portions of the converted text into categories relevant to the type of media content available from Pandora® (e.g., music). Continuing the example, the relevant categories for Pandora® could include one or more of a playlist, an artist, a song, or a control command. In one embodiment, the speech recognition server 22 uses java script object notation (JSON) or a similar method to place different portions of the parsed text into the relevant categories. The categorized text can then be transmitted to the first server 21, so that an appropriate query may be sent to the requested content provider from the first server 21.

In other embodiments, the text from the speech recognition server 22 can be parsed into relevant categories by one or more software programs running on the first server 21 using JSON or a similar method as described above. After the parsed text is placed into relevant categories, the first server 21 can generate an appropriate query (e.g., Play Duran Duran on Pandora) to send to one of the content servers 23, 24. The desired content server can then work with other components in the content distribution system 100 to deliver media content to a user 10 through the audio speaker 101, as will be discussed further below. Delivering media content to the user 10 can include playing audio and/or visual media content for the user including streaming media content as well as playing the media content at a later time after the media content has been downloaded to the content player (e.g., audio speaker 101). In other embodiments, the speech recognition process may alternately be performed by the first server 21, or by the audio speaker 101, without use of the speech recognition server 22.

The first server 21 can be connected to the content servers 23, 24 through respective third and fourth network connections 53, 54 (e.g., Internet connections). The content servers 23, 24 contacted by the first server 21 can then transmit one or more information links, for example one or more uniform resource locators (URL), uniform resource identifiers (URI), or other types of information links that reference a connected media content providing external resource, to the first server 21. The first server 21 can then determine which one of the one or more information links to transmit to the audio speaker 101 using the first network connection 51, so that the audio speaker 101 can contact the corresponding content server 23, 24 at the provided information link directly using a corresponding fifth or sixth network connection 55, 56 (e.g., an Internet connection) to begin the streaming of the media content. The fifth and sixth network connections 55, 56 can be direct network connections between the first transceiver 106C of the audio speaker 101 and the respective content servers 23, 24. In some embodiments, the corresponding content server 23, 24 may determine the most appropriate information link to send to the first server 21 instead of the first server 21 determining the most appropriate information link of multiple information links to send to the audio speaker 101.

The audio speaker 101 may also be connected to the portable electronic device 205 using a seventh connection 57 (e.g., a personal area network connection or a local area network connection) enabling the portable electronic device 205 to control and/or monitor the streaming of media content to the audio speaker 101. The seventh network connection 57 can be a network connection between a second transceiver 106D of the audio speaker 101 and a first transceiver 206C of the portable electronic device 205. However, in some embodiment, the audio speaker 101 may connect to the portable electronic device 205 using the first transceiver 106C. The process of streaming media content to the audio speaker 101 is described in more detail below.

Audio Speaker Example

The audio speaker 101 is one example of a content player that may be used in the content distribution system 100, and may include a wired or wireless speaker, wireless headphones or other similar content playing device. In other embodiments, the content player can be a home automation device, video conferencing hardware, gaming system, a tablet, a laptop, smart phone, a virtual reality headset, or other electronic device that is capable of receiving input from a user 10 and deliver media content (e.g., audio and/or visual media) to the user 10. For example, when the content player is a tablet (e.g., iPad®), the tablet may stream video media content from a content server (not shown) of a video content provider (e.g., Netflix® or YouTube®).

In one embodiment, the content player is an audio speaker 101 that includes a housing 105, an active speaker assembly 110, and a passive speaker assembly 120. The housing 105 of the audio speaker 101 encloses an interior region 103 of the audio speaker 101. The active speaker assembly 110 can include typical speaker components, such as a voice coil (not shown) coupled with a permanent magnet (not shown) for generating sound when an electrical signal is provided to the voice coil. The passive speaker assembly 120 (e.g., a passive radiator) can move in response to the changes in air pressure of the interior region 103 caused by the movements of the active speaker assembly 110 to enable the audio speaker 101 to produce a higher quality sound.

The audio speaker 101 may further include a memory 107, a processing system 106, and a microphone 111. The memory 107 may contain stored data 108 and one or more software applications, such as a software program 109. The processing system 106 can typically include input/output (I/O) hardware 106A, a processor 106B, a first transceiver 106C, and a second transceiver 106D. The I/O hardware 106A may be connected to inputs, such as the microphone 111, as well as one or more buttons, switches, and sensors included in the audio speaker 101. The I/O hardware 106A can further include an analog to digital converter, so that the voice commands from the user 10 and received by the microphone 111 can be analyzed by the processor 106B using the software program 109 enabling key words or phrases to be recognized (e.g., volume up, stop, play etc.) Speech not recognized by the audio speaker 101 can be transmitted to the first server 21 and in some embodiments to the speech recognition server 22 for further analysis.

In one embodiment, the audio speaker 101 can operate in one of two modes for speech recognition. For example in a first mode, the audio speaker 101 can operate in a low-power state, such as when the audio speaker 101 has not delivered media content for a predetermined period of time. In this first low-power mode, the audio speaker 101 can listen only for a few audible commands, such as "Turn On", so that the audio speaker 101 transitions from the low-power mode to a second more active mode, or "Play Music," so that the audio speaker 101 transitions from the low-power mode to the second more active mode and initiates the playing of the next song or other content from a default content provider (e.g., Pandora®).

In the second more active mode, the audio speaker 101 can listen for additional commands for operating the audio speaker 101, interacting with the user's portable electronic device 205, and communicating with one or more of the first server 21 and the content servers 23, 24. For example, commands the user 10 may issue for operating the audio speaker 101 may include voice commands to pause music, adjust the volume, check the battery status, turn the audio speaker 101 off. Commands the user 10 may issue for interacting with the portable electronic device 205, which can be a smart phone, may include voice commands to answer a phone call, ignore a phone call, or open a voice assistant on the portable electronic device 205, such as Siri®. The commands that the user 10 may use for operating the audio speaker 101 or interacting with the portable electronic device 205 may be accomplished by keyword detection on the audio speaker 101. Commands the user 10 may issue for communicating with one or more of the first server 21 and the content servers 23, 24 may include commands requesting media content from a particular content provider (e.g., "Play Fame by David Bowie on Spotify®"). Such commands cannot be resolved locally using the limited keyword detection at the audio speaker 101, and are thus transmitted to the first server 21 and in some embodiments to the speech recognition server 22, so that the speech from the voice command can be parsed into relevant categories as described above, for example using JSON or a similar method. Thus, the more commonly used commands can be resolved locally and quickly using keyword detection on the audio speaker 101 while more complicated commands can be transmitted to one or more of the first server 21 and the speech recognition server 22 to determine the media content requested by the user.

The I/O hardware 106A may further be connected to outputs, such as one or more status indicators (e.g., LEDs) and the active speaker assembly 110. The processor 106B may include a central processing unit (CPU), a digital signal processor (DSP), and/or application-specific integrated circuits (ASIC), and other useful components.

The first transceiver 106C can be a wireless transceiver configured to communicate on a local area network to allow the audio speaker 101 to communicate with the Internet. For example, the first transceiver 106C can be a Wi-Fi transceiver (e.g., IEEE 802.11 a,b,g,n) configured to access the Internet through a wireless access point, such as a wireless router. Through execution of the software program 109, the first transceiver 106C can be used to enable the audio speaker 101 to communicate with one or more of the first server 21, the speech recognition server 22, the first content server 23, and the second content server 24 when a Wi-Fi network with Internet access is available. The second transceiver 106D can be a wireless transceiver configured to communicate on a personal area network, such as Bluetooth® transceiver (e.g., BTLE, Bluetooth classic). The second transceiver 106D can be used to communicate to the portable electronic device 205 allowing the portable electronic device 205 to control and/or monitor the streaming of media content to the audio speaker 101. However, in some embodiments, the audio speaker 101 may communicate with the portable electronic device 205 using the first transceiver 106C and a corresponding transceiver 206C on the portable electronic device 205. In some other embodiments, the audio speaker 101 may additionally or alternately be configured to communicate with other types of external electronic devices, such as a cellular modem, broadband modem, wireless router or other similar device, using the first transceiver 106C and a corresponding transceiver found within the external electronic device.

The memory 107 may be any technically feasible type of hardware unit configured to store data. For example, memory 107 could include some form of non-volatile memory, such as a hard disk, a random access memory (RAM) module, a flash memory unit, or a combination of different hardware units configured to store data. Software program 109, which is stored within the memory 107, includes program code that may be executed by processor 106B in order to perform various functionalities associated with the audio speaker 101.

The stored data 108 may include any type of information that relates to the configuration or control of the audio speaker 101, user data (e.g., user account information for accessing an account stored on the first server 21), useful software applications, or other useful information. In some embodiments, the stored data 108 may include information relating to one or more software applications or tasks being performed by one or more of the software applications stored with the memory 107. The stored data 108 may reflect various data files, settings and/or parameters associated with communicating with the portable electronic device 205 and/or one or more of the servers 21-24 in the first configuration 100A of the content distribution system 100.

Portable Electronic Device

The portable electronic device 205 described herein may be as a smart phone, but other portable electronic devices may be used. For example, the portable electronic device 205 can be a cell phone (e.g., smart phone), a tablet computing device, laptop computer or other similar electronic device. Examples of a portable electronic device 205 may include, but are not limited to an iPhone®, iPad®, Android™ phone, Samsung Galaxy®, Microsoft Surface®, laptop or other similar device. Although the portable electronic device 205 is not required for the first configuration 100A of the content distribution system 100, the portable electronic device 205 may be used to control and/or monitor the streaming of media content to the audio speaker 101. For example, the user 10 can choose to use the portable electronic device 205 to select the media content to stream to the audio speaker 101 or to view the media content (e.g., a song) currently being streamed by the audio speaker 101. Furthermore, the portable electronic device 205 can be used to show the user 10 a history of media content recently played by the audio speaker 101 from one or more content providers or a list of media content (e.g., songs) scheduled to be played next, such as the contents of a playlist. When the portable electronic device 205 is used to select the media content to stream to the audio speaker 101, the communication may be transmitted (1) from the portable electronic device 205 to the audio speaker 101 using network connection 57 and then to the first server 21 using network connection 51, (2) from the portable electronic device 205 directly to the first server 21 using a network connection (not shown), or (3) from the portable electronic device 205 directly to one of the content servers 23, 24 using a network connection (not shown).

The portable electronic device 205 may comprise a processing system 206 and memory 207, which may contain stored data 208 and one or more software applications 209, such as an interface application 209A, a first content provider application 209B (e.g., a Pandora® application for streaming media content from Pandora®), and a second content provider application 209C (e.g., a Spotify® application for streaming media content from Spotify®). The interface application 209A can be used by the portable electronic device 205 to allow the portable electronic device 205 to communicate to the audio speaker 101, and as described in reference to FIG. 2 to also communicate with the first server 21, the first content server 23, and the second content server 24. In some embodiments, the interface application 209A may also communicate to the content provider applications 209B, 209C, to direct these content provider applications on which media content to play from the respective content servers 23, 24. Furthermore, the user 10 may also choose to use one of the content provider applications 209B, 209C to stream media content to the audio speaker 101 without use of the first server 21 or the interface application 209A.

The processing system 206 can include input/output (I/O) hardware 206A and a processor 206B, which may include a central processing unit (CPU), a digital signal processor (DSP), and/or application-specific integrated circuits (ASIC), and other useful components. The I/O devices, which may be connected to the I/O hardware 206A within the portable electronic device 205 may include a speaker 211, a display device 212, a touch sensing device (not shown), a first transceiver 206C, and a second transceiver 206D.

The first transceiver 206C can be a wireless transceiver configured to communicate on a personal area network, such as Bluetooth® transceiver (e.g., BTLE, Bluetooth classic). The first transceiver 206C can be used to communicate to the audio speaker 101 allowing the portable electronic device 205 to control and/or monitor the streaming of media content to the audio speaker 101. Although the first transceiver 206C is described as a Bluetooth® transceiver, in other embodiments the first transceiver 206C can be another type of transceiver, such as a Wi-Fi transceiver. The second transceiver 206D can be a cellular transceiver, such as a GSM, CDMA, GPRS, and fourth generation (4G) telecommunication transceiver. The second transceiver 206D can be used to provide an Internet connection to the audio speaker 101 when another Internet connection (e.g., a Wi-Fi Internet connection) is not available as described in further detail in reference to FIG. 2 below.

The interface application 209A can be used to interact with the audio speaker 101 and one or more of the servers 21-24. For example, as described in reference to the second configuration 100B in FIG. 2 below, the interface application 209A can allow the portable electronic device 205 to act as an intermediary (e.g., an access point for the audio speaker 101 to communicate with the Internet) between the audio speaker 101 and one or more of the servers 21-24. Furthermore, the interface application 209A can be used to control and/or monitor the streaming of media content to the audio speaker 101 from one of the content servers 23, 24. In one embodiment, the interface application 209A can be used by the user for viewing the content currently being played on the audio speaker 101 or for viewing a history of content that has been played on the audio speaker 101.

The software applications, such as interface application 209A, may include software applications that are configured to run in the foreground or background on the portable electronic device 205. For example, much of the functionality of the interface application 209A can operate in the background of the portable electronic device 205 without any direct interaction from the user 10, so that the user 10 can operate other applications and functions of the portable electronic device 205 without any interference from the interface application 209A. For example, the interface application 209A can forward voice commands from the audio speaker 101 to the first server 21 without the user directly interacting with the interface application 209A. However, if the user 10 chooses, the user 10 may directly interact with the interface application 209A in the foreground of the portable electronic device 205 through voice control to the portable electronic device 205 or by manually interacting with the interface application 209A, for example, through use of a touch screen or keyboard. The interface application 209A can give the user 10 a common interface to interact with multiple content providers (e.g., Pandora® and Spotify®), so that the user 10 does not need to learn the differences between the native applications of the different content providers (e.g., Pandora® and Spotify®).

The memory 207 may be any technically feasible type of hardware unit configured to store data. For example, the memory 207 could include some form of non-volatile memory, such as a hard disk, a random access memory (RAM) module, a flash memory unit, or a combination of different hardware units configured to store data. Software program 209, which is stored within the memory 207, includes program code that may be executed by processor 206B in order to perform various functionalities associated with the portable electronic device 205.

The stored data 208 may include any type of information that relates to the configuration or control of the portable electronic device 205, user data, useful software applications, or other useful information. In some embodiments, the stored data 208 may include information relating to one or more software applications or tasks being performed by one or more of the software applications stored with the memory 207. The stored data 208 may reflect various data files, settings and/or parameters associated with communicating with the audio speaker 101 or one or more of the servers 21-24 in the first configuration 100A of the content distribution system 100.

Second Configuration

FIG. 2 is a block diagram of the user 10 interacting with a second configuration 100B of the content distribution system 100, according to one embodiment of the disclosure provided herein. The second configuration 100B allows the media content can be streamed to the audio speaker 101 through the portable electronic device 205 when an Internet connection is not available to the audio speaker 101 without the use of the portable electronic device 205. For example, in some embodiments, the portable electronic device 205 can communicate with the Internet using a cellular connection to allow the transmission of media content to the audio speaker 101 when another Internet connection is unavailable for the audio speaker 101.

The second configuration 100B of the content distribution system 100 is the same as the first configuration 100A of the content distribution system 100 except that some of the network connections between the content player (e.g., audio speaker 101) and the other equipment are different. For example, in the second configuration 100B, the audio speaker 101 no longer has access to the first network connection 51, which was the network connection between the first transceiver 106C (i.e., the Wi-Fi transceiver) of the audio speaker 101 and the first server 21. Similarly, in the second configuration 100B, the audio speaker 101 has lost the network connections 55, 56 to the respective content servers 23, 24 as these network connections 55, 56 also used the first transceiver 106C of the audio speaker 101.

In order for the audio speaker 101 to communicate to the first server 21 and the respective content servers 23, 24 network connections with the portable electronic device 205 can be used. In one embodiment of the second configuration 100B, the portable electronic device 205 can communicate with the audio speaker 101 using a personal area network (e.g., a Bluetooth connection), and the portable electronic device 205 can communicate with the first server 21 and the content servers 23, 24 using a cellular connection or Wi-Fi connection to the Internet. In the second configuration, the audio speaker 101 maintains communication to the portable electronic device 205 using the network connection 57, which as described above can be a Bluetooth® connection. Although the network connection between the audio speaker 101 and the portable electronic device 205 is largely described as a Bluetooth® connection between the second transceiver 106D of the audio speaker 101 and the first transceiver 206C (e.g., a Bluetooth® transceiver) of the portable electronic device 205, in some embodiments, the audio speaker 101 may communicate to the portable electronic device 205 using the first transceiver 106C (e.g., a Wi-Fi transceiver) and a corresponding transceiver (not shown) of the portable electronic device 205, so that the portable electronic device 205 can act as an access point (e.g., a wireless access point, such as a mobile hotspot to allow Internet tethering) for the audio speaker 101. For example, using a Wi-Fi connection instead of a Bluetooth® connection may be appropriate when the audio speaker 101 and the portable electronic device 205 are located further apart than is recommended for Bluetooth® communication. On the other hand, using a Bluetooth® connection between the audio speaker 101 and the portable electronic device 205 may be appropriate when a low power draw for the audio speaker 101 and/or the portable electronic device 205 is preferred as Wi-Fi communication generally consumes more power than Bluetooth® communication techniques.

The portable electronic device 205 includes the second transceiver 206D, which as described above can be a cellular transceiver, such as a GSM, CDMA, GPRS, and fourth generation (4G) telecommunication transceiver. In some other configurations, the second transceiver 206D can be a Wi-Fi enabled transceiver. The portable electronic device 205 can use its second transceiver 206D to maintain a mobile broadband connection to the Internet and servers 21, 23, and 24 when an Internet connection is unavailable to the audio speaker 101 through the first network connection 51. Thus, in the second configuration 100B, the portable electronic device 205 is connected with the first server 21 through a first mobile network connection 351, the portable electronic device 205 is connected with the first content server 23 through a second mobile network connection 352, and the portable electronic device 205 is connected with the second content server 24 through a third mobile network connection 353. Furthermore, in the second configuration 100B, the first server 21 maintains the second network connection 52 to the speech recognition server 22, the third network connection 53 to the first content server 23, and the fourth network connection 54 to the second content server 24.

Having the portable electronic device 205 maintain the network connections to the servers 21, 23, and 24 allows streaming of media content to the audio speaker 101 to begin or continue when the first network connection 51 (see FIG. 1) is no longer available.

Content Delivery Process Flow

Figure 3A:
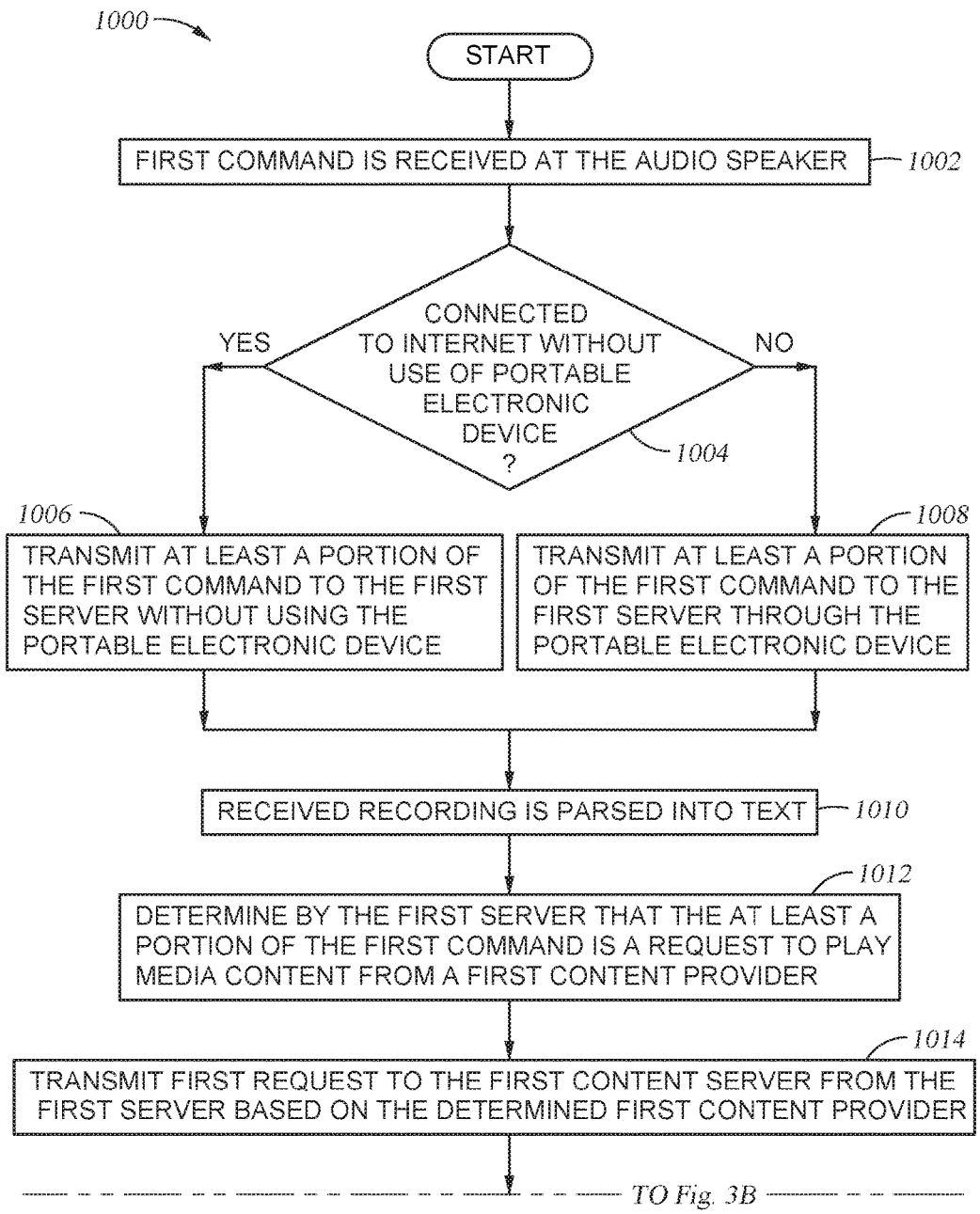
FIGS. 3A and 3B show a process flow diagram of a method for starting a streaming of media content to the audio speaker.
Figure 3B:
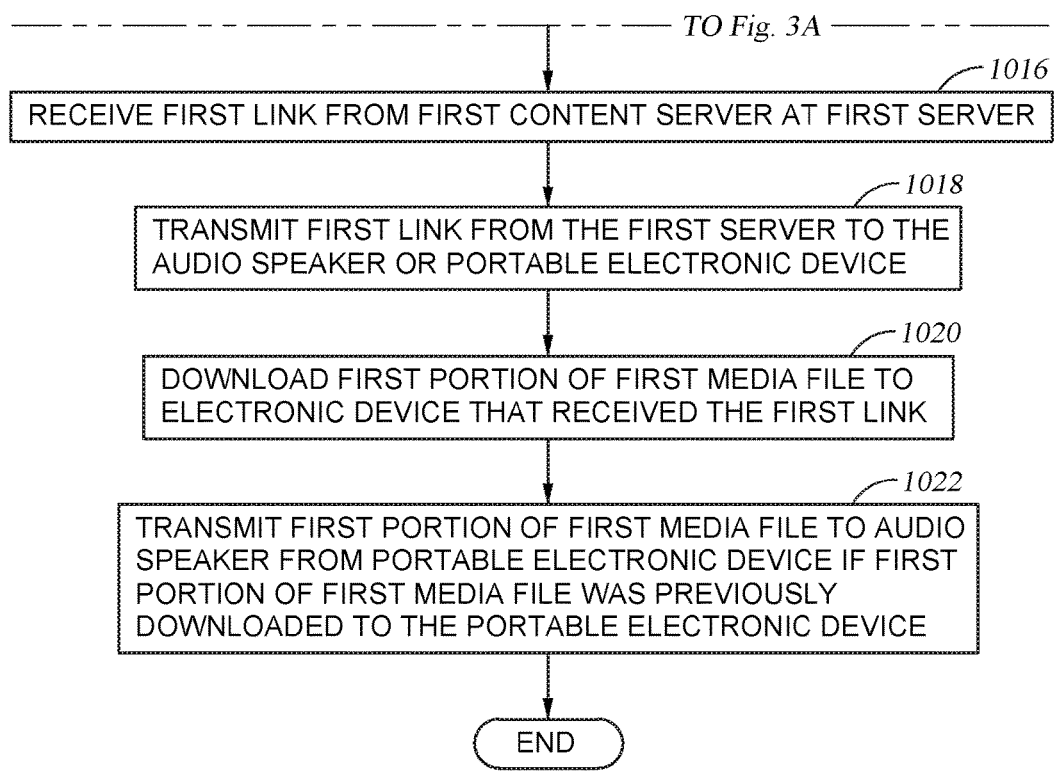

FIGS. 3A and 3B show a process flow diagram of a method 1000 for starting a streaming of media content to a content player (e.g., audio speaker 101). Although the method 1000 is described in reference to the blocks shown on FIGS. 3A and 3B, persons skilled in the art would understand that the method steps in other suitably adapted orders is also within the scope of the embodiments disclosed. Referring to FIGS. 1, 2, 3A, and 3B, the method 1000 is described.

At block 1002, a first command (e.g., voice command 11) is received at the audio speaker 101 to perform some desired activity, such as to deliver media content (e.g., play audio and/or visual media content using the content player) from an Internet content provider to the user 10 using the audio speaker 101. For example, the audio speaker 101 can receive a voice command, such as "Play Led Zeppelin on Pandora®." Receiving a voice command by the audio speaker 101 can include recognizing by the audio speaker 101 that the speech was intended to be a command to perform some desired activity. The audio speaker 101 can include hardware (e.g., microphone 111 and analog to digital converter of I/O hardware 106A) and software enabling the audio speaker 101 to recognize certain words, utterances, or phrases, such as ("Play, Volume Up, Volume Down). Furthermore, in some embodiments a specific word, utterance, or phrase can alert the audio speaker 101 to listen to a voice command following the specific word, utterance, or phrase. For example, in one embodiment the audio speaker 101 can be configured to be alerted when the phrase "Hey Boom" is spoken in proximity to the audio speaker 101, so that the audio speaker 101 can record the speech immediately following the specific word or phrase, such as "Play Led Zeppelin on Pandora®." Besides responding to commands to deliver media content to the user 10, the audio speaker 101 can also respond to commands to perform other desired activities, such as downloading media content without delivering the media content to the user 10, so that the user 10 can listen and/or watch the media content at a later time without a concern for Internet connectivity at that time.

At block 1004, the audio speaker 101 determines if the audio speaker 101 is connected to the Internet without use of the portable electronic device 205. In one example, the audio speaker 101 may assure that there is a connection through the first transceiver 106C enabling a Wi-Fi connection to the Internet that does not use the portable electronic device 205 as a mobile hotspot.

At block 1006, if the audio speaker 101 is connected to the Internet without use of the portable electronic device 205, then the audio speaker 101 transmits at least a portion of the first command to the first server 21 using the first transceiver 106C and the first network connection 51.

At block 1008, if the audio speaker 101 is not connected to the Internet without use of the portable electronic device 205, then the audio speaker 101 transmits at least a portion of the first command to the first server 21 through the portable electronic device 205. For example, the audio speaker 101 may use the second transceiver 106D and the seventh network connection 57 to transmit at least a portion of the first command to the portable electronic device 205. The interface application 209A on the portable electronic device can then be used to transmit the received portion of the first command to the first server 21. Thus, executing block 1006 or block 1008 each result in the at least a portion of the first command being transmitted to the first server 21. As an example, the portion of the first command received at the first server 21 from executing block 1006 or 1008 may include the electronic representation of the spoken phrase "Play Led Zeppelin on Pandora" or the recording of "Led Zeppelin on Pandora" with additional data indicating that a play command was received at the audio speaker 101. In embodiments in which the audio speaker 101 is not using the portable electronic device 205 as a mobile hotspot, the at least a portion of the first command can also be transmitted to the first server 21 from the audio speaker 101 with use of the interface application 209A. In some of these embodiments in which the audio speaker 101 is not using the portable electronic device 205 as a mobile hotspot and the audio speaker 101 is using Bluetooth® to communicate to the portable electronic device 205, then the interface application 209A or the respective content server 23, 24 can be used to convert the media content to Bluetooth® protocol. In other embodiments, when the portable electronic device 205 is being used as a mobile hotspot, the at least a portion of the first command can be transmitted to the first server 21 without use of the interface application 209A as the portable electronic device is functioning similarly to an Internet connected wireless router.

At block 1010, the received portion of the first command is parsed into a text string by one or more components within the content distribution system 100. In some embodiments, the received portion of the first command can optionally be transmitted to the speech recognition server 22 to convert the portion of the first command into text and further optionally parse the converted into relevant categories (e.g., content provider, artist, song, etc.) as described above, for example using JSON or a similar method. However, in some embodiments, the first server 21 may convert the portion of the first command into text without use of the speech recognition server 22. When the speech recognition server 22 is used, the first server 21 optionally transmits the received portion of the first command to the speech recognition server 22 using the second network connection 52, and then the speech recognition server 22 returns the parsed text to the first server 21.

At block 1012, the first server 21 determines that the at least a portion of the first command is a request to deliver media content to the audio speaker 101, where the media content is associated with one or more keywords from a first content provider (i.e., a source that is remote from the audio speaker 101 and the first server 21, such as an Internet accessible content provider like Pandora® or Spotify®). For example, the first server 21 can determine that the user made a request to play media content associated with the keywords "Led Zeppelin" from a specific content provider "Pandora®," and that the content provider can be accessed at a corresponding content server, such as the first content server 23. The first server 21 can maintain a list of content providers for each user 10. For example, each user 10 may provide user account information (e.g., username and password) for each content provider that the first server 21 can contact on their behalf for streaming media content, and the first server 21 can generate the list based on the provided accounts or work from a list of commonly used content providers.

The first server 21 can also store account information for the user 10 for a plurality of content providers alleviating the need for the user to configure the audio speaker 101 and/or portable electronic device 205 to retain this information. In this way the user can stream different types of media content (e.g., music and video) from a plurality of content providers (e.g., Pandora®, Spotify®, YouTube®, and Netflix®) on multiple devices (e.g., a speaker, a tablet, and a laptop) by only linking these devices to one account on the first server 21, where the one account on the first server 21 includes the user's account information (e.g., username and password) for the plurality of content providers. Furthermore, the user can also be relieved from installing native applications on multiple electronic devices, such as installing a Pandora® application and a Spotify® application on the portable electronic device 205 and similar devices. Therefore, having the user's account information for the content providers stored in an Internet accessible location can streamline the process for the user to begin streaming media content to the user's electronic devices, and save the user the hassle of configuring new devices for each of the content providers for which the user has an account. On the other hand, in some embodiments, the content distribution system 100 can leverage the use of native applications (e.g., a Pandora® application and a Spotify® application) installed on the portable electronic device 205 that may offer enhanced functionality for the user or a less complicated task for having the single interface application 209A communicate with a variety of content providers.

The list on the first server 21 associated with the content providers accessed by a given user can have be a list of identifiers which the first server 21 can recognize, such as the name of the content provider (e.g., Pandora®) or a word or phrase chosen by the user to identify a specific content provider (e.g., "Tube" for YouTube®). The first server 21 can analyze the parsed text provided in block 1010 to determine the identifier of a given content provider if such analysis was not completed by the speech recognition server 22. In some embodiments, the remainder of the text that is not the identifier of the content provider can be taken as the one or more keywords that are associated with the requested media content. In other embodiments, the first server 21 may remove text thought to be less relevant to the requested media content. For example, if the entire parsed text reads "Can you play Led Zeppelin on Pandora® please," the first server 21 may remove the words "can", "you," "play," "on," and "please" from the request sent to the first content provider at the first content server 23. Having the first server 21 perform tasks, such as communicating with the speech recognition server 22 and initiating contact with the content servers 23, 24 offers a cloud-centric approach for many of the tasks that are completed to begin a download of media content to the audio speaker 101. This cloud centric approach can reduce the complexity of the hardware, firmware, and software on the content players, such as the audio speaker 101. Furthermore, the cloud-centric approach is more sustainable over time because it is easier to make updates to servers, such as the first server 21, in a centralized location than it is to have consumers of content players, such as the audio speaker 101, update the firmware and or hardware of their content players.

At block 1014, a first request is transmitted to the first content server 23 from the first server 21 based on the determined first content provider (i.e., Pandora®) and the one or more keywords associated with the requested media content. For example, the first request can be a request for an information link (e.g., a URL or URI) to play media content associated with the provided keywords (e.g., Led Zeppelin). In some embodiments, the first request can also include account information of the user 10 for the first content provider, such as a username and password of the user 10 for the first content provider. In this way the content provider may be able to provide a more relevant response to the first request, such as if the content provider has stored information about the user's streaming habits like favorite songs by various musicians.

At block 1016, the first server 21 receives one or more information links (e.g., URLs or URIs) from the first content server 23 that can be accessed to stream media content associated with the request provided to the first content server 23. For example, a first information link could be provided to initiate streaming of "Stairway to Heaven" by "Led Zeppelin" while another information link could be to initiate streaming of "Whole Lotta Love" by "Led Zeppelin."

At block 1018, the first server 21 transmits a first information link of the one or more information links received from the first content server 23 to the audio speaker 101 or the portable electronic device 205 using the corresponding network connection that was used to transmit the first command to the first server 21 from the audio speaker 101 or portable electronic device 205 above (i.e., the first network connection 51 in the first configuration 100A or the first mobile network connection 351 in the second configuration 100B). If the portable electronic device 205 is being used as a mobile hotspot, then the first information link could be transmitted to the audio speaker 101 through the portable electronic device 205. In some embodiments, the first server 21 can first determine which information link received from the first content server 23 to transmit to the audio speaker 101. For example, if the converted speech to text included the word "stairway" or related words, such as "stair" or "stare," then the first server 21 may be able to determine that the information link to "Stairway to Heaven" is the more appropriate information link to send to the audio speaker 101.

At block 1020, the electronic device (i.e., audio speaker 101 or portable electronic device 205) that received the first information link from the first server 21 contacts the first content server 23 at the first information link to download the first portion of the first media file. Thus, if the audio speaker 101 received the first information link from the first server 21 using the first network connection 51 in the first configuration 100A of the content distribution system 100 (See FIG. 1), then the audio speaker 101 can contact the first content server 23 at the first information link to begin downloading the first portion of the first media file using the fifth network connection 55 of the first configuration 100A of the content distribution system 100. Similarly, if the portable electronic device 205 received the first information link from the first server 21 using the first mobile network connection 351 of the second configuration 100B of the content distribution system 100 (See FIG. 2), then the portable electronic device 205 can contact the first content server 23 at the first information link to begin downloading the first portion of the first media file using the second mobile network connection 352 of the second configuration 100B of the content distribution system 100. Furthermore, if the audio speaker 101 received the first information link through an Internet connection that uses the portable electronic device 205 as a mobile hotspot, then the audio speaker 101 can contact the first content server 23 at the first information link to download the first portion of the first media file using the portable electronic device 205 as a mobile hotspot. The audio speaker 101 and portable electronic device 205 can be configured to begin a download of at least a first portion of the first media file (e.g., a file containing the recording of "Stairway to Heaven" by Led Zeppelin) when the respective electronic device 101, 205 contacts the first content server 23 at the first information link.

When the first portion of the first media file is downloaded to the portable electronic device 205, the interface application 209A on the portable electronic device 205 can be used to initiate the contact with the first content server 23 at the first information link to download the first media file. The interface application 209A can then be used to transmit the downloaded portions of the first media file to the audio speaker 101 for delivering the content to the user 10. The interface application 209A can be used to initiate downloads from a plurality of content providers, which allows the user to have the same experience for initiating a download regardless of the content provider when the interface application 209A is used. Furthermore, the user can also choose to interact with the interface application 209A, for example to look at a playlist or other available media content, and the interface application 209A can offer the user a common platform for interacting with a variety of content providers. The interface application 209A can further include speech recognition capabilities if the user would rather give voice commands to the portable electronic device 205 than to the audio speaker 101, for example if the user is physically closer to the portable electronic device 205 than the user is to the audio speaker 101.

At block 1022, if the first portion of the first media file was downloaded to the portable electronic device 205 at block 1020, then the portable electronic device 205 can transmit the downloaded first portion of the first media file to the audio speaker 101, for example using the interface application 209A and the seventh network connection 57, which as described above can be a personal area network connection, such as a Bluetooth® connection. After receiving a sufficient amount of the first media file regardless of how the first media file was downloaded to the audio speaker 101, the audio speaker 101 can begin delivering the media content of the first media file to the user 10.

Although the interface application 209A can generally be used to download portions of the first media file to the portable electronic device 205 when the audio speaker 101 does not have an alternative Internet connection, in some embodiments, the interface application 209A can communicate with a corresponding native application (e.g., the first content provider application 209B, which could be a Pandora® application) installed on the portable electronic device 205, for example by making the first information link available to the corresponding native application, so that the corresponding native application can initiate the download of the first portion of the first media file. For some portable electronic devices, internal application to application communication may be unavailable. In such embodiments, the interface application 209A may communicate to the audio speaker 101 to notify the audio speaker 101 of the identified content provider and of the first information link. The audio speaker 101 may then respond back to the portable electronic device 205 with a message to open the corresponding native application and to contact the first content server 23 at the first information link using the corresponding native application. The first server 21 may similarly be used for this communication, for example during block 1018 described above, so that an extra step of messaging the audio speaker 101 can be avoided. After the first portion of the first media file is downloaded to the portable electronic device using the corresponding native application, the corresponding native application can then transmit the downloaded media content to the audio speaker 101 to deliver the media content to the user 10.

Having the corresponding native application download the first media file instead of the interface application 209A can be advantageous because the user 10 can then open the corresponding native application on the portable electronic device and have access to all of the functionality that the native application offers the user 10. At the same time, even if the corresponding native application is used to download the first media file, the communication to the corresponding native application may occur in the background on the portable electronic device 205, so that the user 10 may otherwise be unaware that the corresponding native application is being used. Furthermore, the user 10 may also be unaware that the portable electronic device 205 is being used at all to download portions of the first media file to the audio speaker 101 when an Internet connection to the audio speaker 101 without use of the portable electronic device 205 is unavailable. The result is that the user 10 can interact with the audio speaker 101 in the same way to download media content to the audio speaker 101 regardless of whether the download occurs with or without use of the portable electronic device 205.

Furthermore, the user 10 can interact with the audio speaker 101 in the same way to download additional media content from other content servers after downloading the first media file. For example, the user 10 can download a second media file from the second content server 24 after downloading the first media file from the first content server 23 by using a second command that is similar to the first command described above in reference to block 1002, but differing from the first command by including a different content provider and generally different media content. Method 1000 can then be executed using the second command in the same way that method 1000 was executed using the first command described above, where the main differences are that a second media file is downloaded from the second content server 24 instead of the first media file being downloaded from the first content server 23 described above. Allowing the user 10 to download different media content from various content providers using the same types of commands (e.g., voice command 11) harmonizes the process of streaming media content for the user 10 to the audio speaker 101 creating an enjoyable experience for the user 10.

Although method 1000 is described as sending an information link from the first content server 23 to the audio speaker 101 through the first server 21, so that the audio speaker 101 may contact the first content server 23 at the provided information link, in other embodiments, the first content server 23 may contact the audio speaker 101 directly to streamline the process of initiating the download of the media content. For example, in such embodiments, the audio speaker 101 may provide the first server 21 one or more addresses, and the first server 21 can in turn provide the one or more addresses to the first content server 23. In response, the first content server 23 may contact the audio speaker 101 directly (i.e., without further use of the first server 21). Thus, in some cases, first content server 23 (e.g., a service provider) may use standard or proprietary methods to "push" content to the audio speaker 101 for playback without the need for first server 21 to pass the audio speaker 101 the information link (e.g., URL). In one example, when the audio speaker 101 is communicating with the Internet using the first transceiver 106C, then the one or more addresses provided may include one or more of a public IP address of a gateway used by the audio speaker 101, a local area network IP address of the audio speaker 101, a MAC address of the audio speaker 101, and one or more ports on the audio speaker that may be configured for enabling communication with a content server, such as the first content server 23. When the audio speaker 101 is communicating with the Internet using the second transceiver 106D and the portable electronic device 205, then the one or more addresses may include the public IP address of the portable electronic device 205 and the Bluetooth address of the audio speaker 101 or a local area network IP address of the audio speaker 101 in the case in which the audio speaker 101 is communicating to the portable electronic device using Wi-Fi. In one embodiment, the first content server 23 can initiate the communication with the audio speaker 101 using the one or more addresses and provide the audio speaker with the first (e.g., a URL) to begin downloading media content from the first content server 23.

Figure 4:
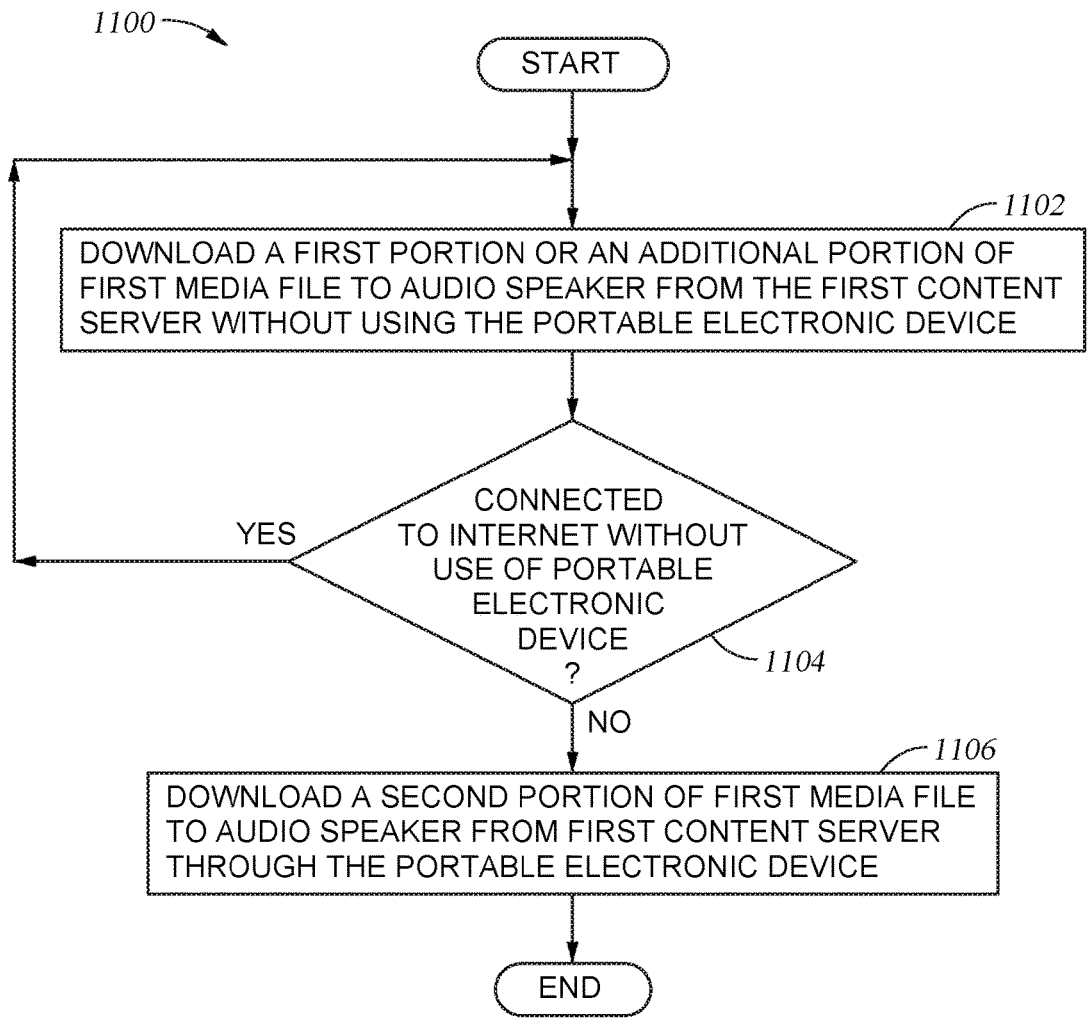
FIG. 4 is a process flow diagram of a method for continuing a streaming of media content to the audio speaker when the Internet connection to the first transceiver of the audio speaker is lost.

FIG. 4 is a process flow diagram of a method 1100 for continuing a streaming of media content to the audio speaker 101 when the Internet connection between the audio speaker 101 and the first content server 23 is lost, such as network connection 55 to the first transceiver 106C of the audio speaker 101 shown in FIG. 1. Although the method 1100 is described in reference to the blocks shown on FIG. 4, persons skilled in the art would understand that the method steps in other suitably adapted orders is also within the scope of the embodiments disclosed. Referring to FIGS. 1, 2, and 4, the method 1100 is described.

At block 1102, the audio speaker 101 downloads at least a first portion of the first media file from the first content server 23 using the fifth network connection 55, which connects the first content server 23 to the first transceiver 106C of the audio speaker 101.

At block 1104, the audio speaker 101 checks whether the audio speaker 101 is still connected to the Internet without use of the portable electronic device 205. If the audio speaker 101 is still connected to the Internet without use of the portable electronic device 205, then the audio speaker 101 continues to download additional portions of the first media file from the first content server 23 using the first transceiver 106C and the fifth network connection 55 at block 1102, so that the user 10 can continue to stream media content with the audio speaker 101. However, if the audio speaker 101 has lost the connection to the Internet without the current use of the portable electronic device 205, then a second portion of the first media file is downloaded to the audio speaker 101 from first content server 23 through the portable electronic device 205 using the second transceiver 106D at block 1106, so that the user 10 can continue to stream media content with the audio speaker 101.

In some embodiments, execution of software program 109 on the audio speaker 101 can be used transmit a message including the first information link or modified first information link that includes status of how much of the download has completed to the portable electronic device 205 using the seventh network connection 57 to alert the portable electronic device 205 of the lost Internet connection. For example, the message from the audio speaker 101 can be received by the interface application 209A of the portable electronic device 205. Execution of the interface application 209A can then cause the portable electronic device 205 to initiate downloading of the second portion of the first media file to the portable electronic device 205 using the second mobile network connection 352 between the portable electronic device 205 and the first content server 23. Further execution of the interface application 209A can then be used to transmit the second portion of the first media file to the audio speaker 101 using the seventh network connection 57 between the audio speaker 101 and the portable electronic device 205 as described above in reference to block 1022 of FIG. 3B.

Furthermore, in some embodiments, the memory 107 of the audio speaker 101 includes a buffer that can enable uninterrupted streaming of the first portion and the second portion of the first media file when the audio speaker 101 determines that the fifth network connection 55 to the first content server 23 has been lost. For example, the buffer in the memory 107 can be large enough, so that when the audio speaker 101 determines that the fifth network connection 55 to the first content server has been lost, there is enough time at normal download speeds (e.g., normal download speed for the type of cellular connection available to the portable electronic device 205, such as a 4G cellular network connection) for the portable electronic device 205 to establish the second mobile network connection 352 and allow for the audio speaker 101 to download the second portion of the first media file to the buffer in the memory 107 before the audio speaker 101 has delivered all of the first portion of the first media file to the user. Thus, the buffer in the memory 107 can enable delivering at least part of the first portion of the first media file on the audio speaker 101 to the user before the download of the second portion begins and delivering at least part of the second portion of the first media file on the on the audio speaker 101 to the user without any interruption between the delivering of the first portion and the second portion of the first media file.

Therefore, the method 1100 can allow for a user to begin streaming a media file to the audio speaker 101 when a Wi-Fi connection to the Internet for the audio speaker 101 is available without use of the portable electronic device, and then allow for uninterrupted streaming of the first media file by the audio speaker 101 when that Wi-Fi Internet connection is lost, and a cellular connection to the Internet through the portable electronic device 205 is available. For example, a user could be streaming media content to the audio speaker 101 at their house through the user's home Wi-Fi Internet connection, and then continue uninterrupted streaming to the audio speaker 101 when they leave the user's home because the audio speaker 101 and the portable electronic device 205 can begin downloading additional portions of the media content as soon as the Wi-Fi Internet connection is lost, and thus switch from the configuration shown in FIG. 1 to the configuration shown in FIG. 2.

Furthermore, in some embodiments, the audio speaker 101 can prompt the portable electronic device 205 to begin downloading media content as soon as the signal strength of the Wi-Fi connection to the Internet (e.g., the fifth network connection 55) drops below a predetermined threshold (e.g., a signal strength at which the Internet connection through the portable electronic device 205 may be faster or more reliable). Furthermore, after downloading a second portion through the portable electronic device 205, the audio speaker 101 may download a third portion of the first media file without use of the portable electronic device 205 when an Internet connection, which does not use the portable electronic device 205, becomes available again or available again at a predetermined signal strength. Thus, the audio speaker 101 can continue downloading various portions of a given media file using multiple Internet connections (e.g., a user's home Wi-Fi Internet connection, an Internet connection through the user's smart phone, and a Wi-Fi Internet connection at a location other than at the user's home) without the user noticing because the streaming of the media content is uninterrupted for the user.

In some embodiments, the buffer in the memory 107 can also be used to allow the user to consecutively stream two media files from two separate content providers (e.g., Pandora® and Spotify®). For example, the user 10 may initially give a first command (e.g., voice command 11 of FIG. 1) to play media content from Pandora®, for example from the first content server 23, and then while the media content from Pandora® is playing, the user 10 can give a second command (e.g., voice command 11 of FIG. 1) to play media content from Spotify® next. The user's second command can be routed to the first server 21 to initiate download of the media content from Spotify®, for example from the second content server 24, to the audio speaker 101 as described above (see e.g., FIGS. 3A and 3B). Then the media content from Spotify® can begin playing immediately following the playing of the media content from Pandora®, so that the user does not notice any interruption between the playing of the media content from the two content providers.

Figure 5:
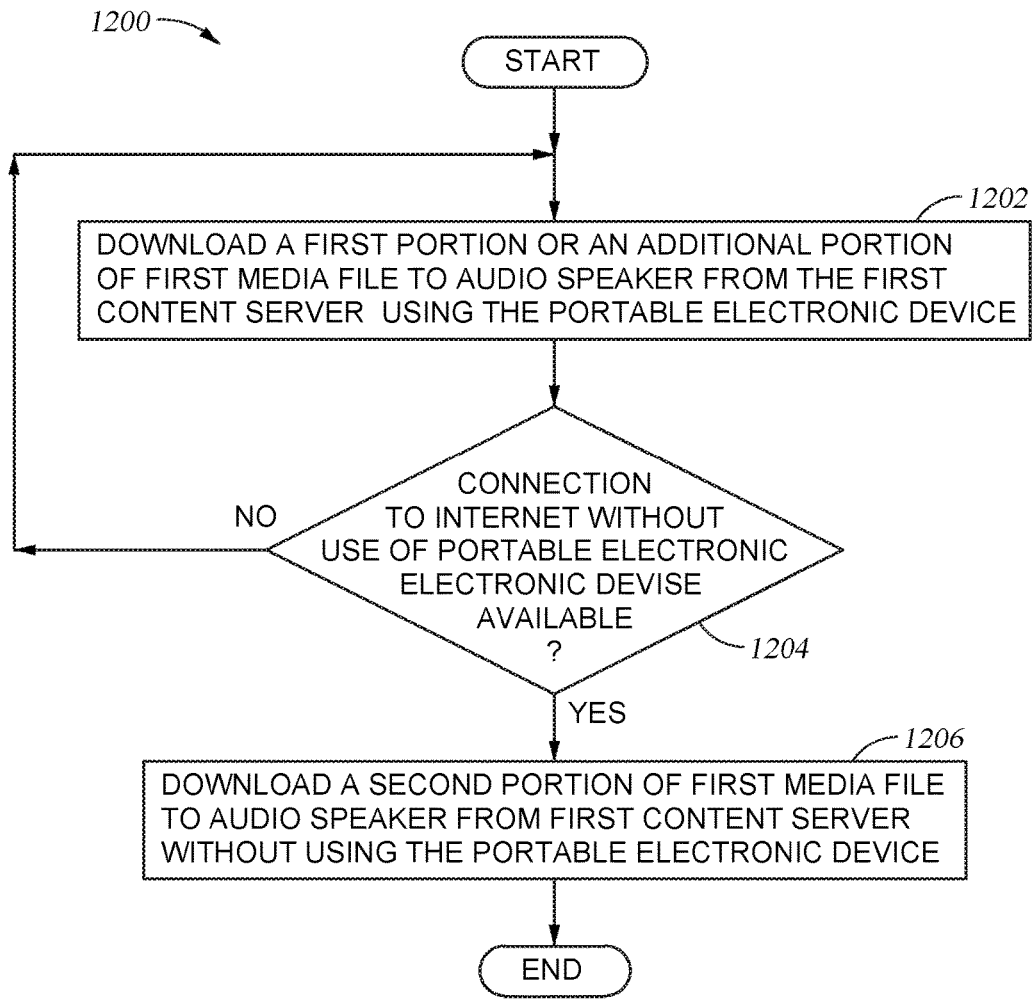
FIG. 5 is a process flow diagram of a method for rerouting a streaming of media content to the audio speaker when the Internet connection to the first transceiver of the audio speaker becomes available.

FIG. 5 is a process flow diagram of a method 1200 for rerouting a streaming of media content to the audio speaker 101 when an Internet connection to the audio speaker 101 becomes available. Although the method 1200 is described in reference to the blocks shown on FIG. 5, persons skilled in the art would understand that the method steps in other suitably adapted orders is also within the scope of the embodiments disclosed. Referring to FIGS. 1, 2, and 5, the method 1200 is described.

At block 1202, at least a first portion of the first media file is downloaded to the audio speaker 101 from the first content server 23 through the portable electronic device 205. Through execution of the interface application 209A, the portable electronic device 205 can initiate the downloading of the first portion of the first media file to the portable electronic device 205 using the second mobile network connection 352 between the portable electronic device 205 and the first content server 23 as described above in reference to block 1020 of FIG. 3B. Through further execution of the interface application 209A, the portable electronic device 205 can then transmit the first portion of the first media file to the audio speaker 101 using the seventh network connection 57 between the second transceiver 106D of the audio speaker 101 and the portable electronic device 205 as described above in reference to block 1022 of FIG. 3B, so that the first portion of the first media file is downloaded to the audio speaker 101. The portable electronic device 205 can also transmit the first information link to the audio speaker 101, so that the audio speaker 101 may download additional portions of the first media file if an Internet connection for the audio speaker 101 becomes available.

At block 1204, the audio speaker 101 checks whether an Internet connection to the audio speaker 101 without use of the portable electronic device 205 (e.g., a Wi-Fi Internet connection using the first transceiver 106C) is available at sufficient strength (i.e., a signal strength above a predetermined threshold), for example by executing the software program 109. If an Internet connection to the audio speaker 101 without use of the portable electronic device 205 is not available, then additional portions of the first media file are downloaded to the audio speaker 101 from the first content server 23 using the portable electronic device 205 at block 1202. If a direct Internet connection to the audio speaker 101, without use of the portable electronic device 205, becomes available, then the audio speaker 101 downloads a second portion of the first media file from the first content server 23 without using the portable electronic device 205, such as by using the fifth network connection 55 between the first transceiver 106C of the audio speaker 101 and the first content server 23 at block 1206.

In one embodiment, the software program 109 of the audio speaker 101 can be executed by the processor 106B to monitor whether there are Internet connections available to the audio speaker 101 without use of the portable electronic device 205, such as Wi-Fi Internet connections available through the first transceiver 106C. Furthermore, in some embodiments, the software program 109 can be executed to test download speeds through Internet connections available to the audio speaker 101, so the audio speaker 101 may only decide to download additional portions of the first media file without use of the portable electronic device 205 when the Internet connection is sufficient (i.e., the media content can be streamed at a desired quality or definition) or in some cases superior to the Internet connection available to the audio speaker 101 through the portable electronic device 205.

The software program 109 of the audio speaker 101 can be further executed to transmit a message to the interface application 209A of the portable electronic device 205 to stop downloading additional portions of the first media file when the audio speaker 101 has determined that additional portions of the first media file will be downloaded through a direct Internet connection that does not use the portable electronic device 205. In some embodiments, the audio speaker 101 can receive an updated first information link from the portable electronic device 205 before the audio speaker 101 begins to download additional portions of the first media file without use of the portable electronic device 205. In other embodiments, the audio speaker 101 can monitor how much of the first media file has downloaded to the audio speaker 101, and can use that information to know what additional portions of the first media file to download from the first content server 23.

Downloading additional portions of the first media file from the first content server 23 to the audio speaker 101 using the fifth network connection 55 instead of the seventh network connection 57 and the second mobile network connection 352 can improve the user's experience of interacting with the audio speaker 101 and the portable electronic device 205. For example, downloading media content to the audio speaker 101 when a Wi-Fi connection to the Internet (e.g., the fifth network connection 55) is available reduces the risk of an interruption to the streaming of the media content. For example, the performance of other tasks on the portable electronic device 205, such as receiving a phone call or taking a picture, can cause streaming of the media content to the audio speaker 101 through the portable electronic device 205 to become interrupted due to a burden on the resources of the portable electronic device 205 that can occur when multiple operations are being performed simultaneously on the portable electronic device 205.

Furthermore, because performing multiple operations on the portable electronic device 205 can burden the portable electronic device 205, the user's experience during use of the portable electronic device 205 can be improved when the portable electronic device 205 is not unnecessarily burdened with the task of streaming media content to the audio speaker 101 when an independent Internet connection for the audio speaker 101 is available. The audio speaker 101 and the portable electronic device 205 can cycle through the methods 1100 and 1200 numerous times without any input from the user, so that the risk of interrupted streaming is reduced when the Internet connection to the audio speaker 101 without use of the portable electronic device 205 is weak or lost, and the user's experience for interacting with the portable electronic device 205 is improved when the Internet connection for the audio speaker 101 without use of the portable electronic device 205 becomes available at sufficient strength.

Third Configuration

Figure 6:
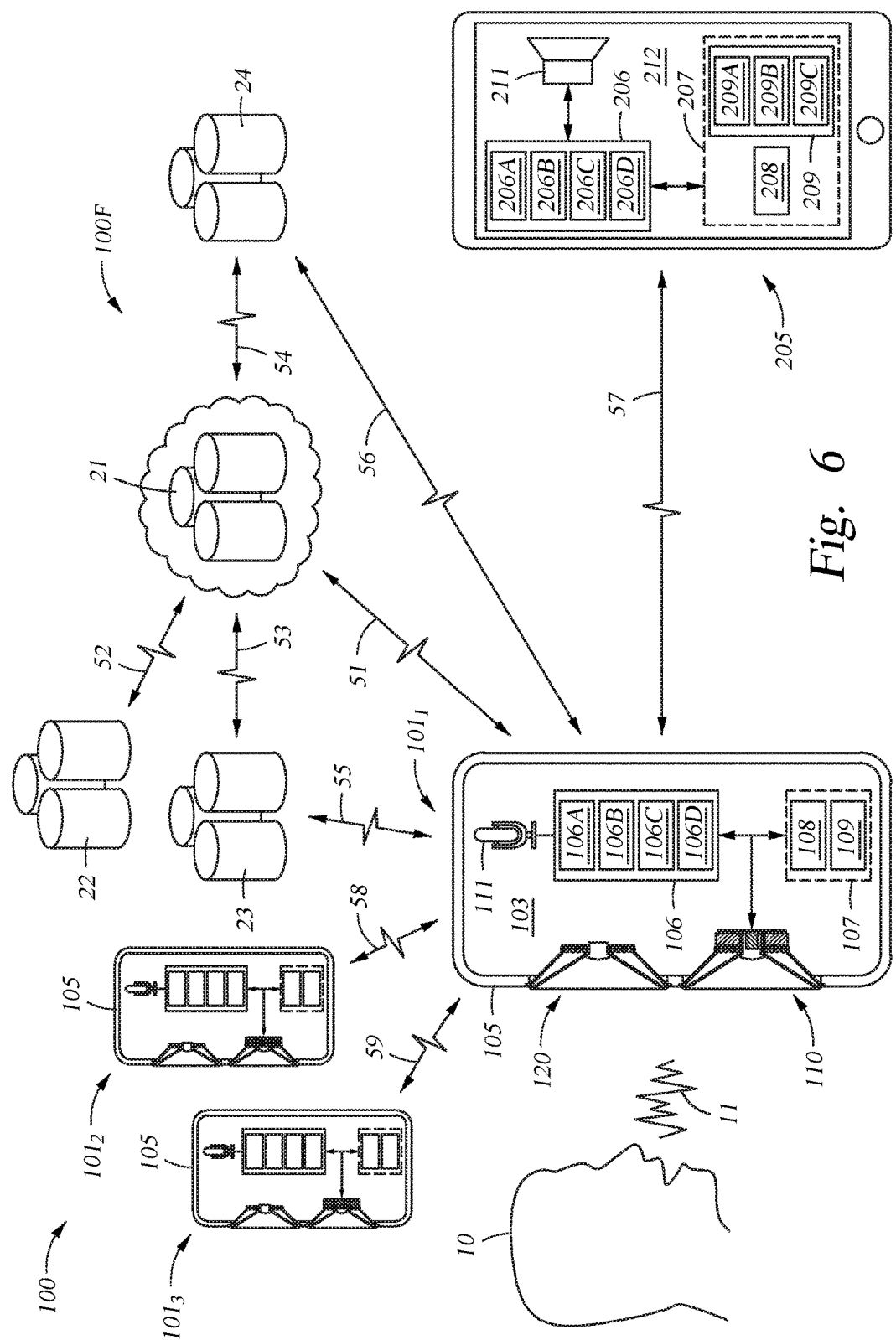
FIG. 6 is a block diagram of the user interacting with a third configuration of the content distribution system, according to one embodiment.

FIG. 6 is a block diagram of the user 10 interacting with a third configuration 100F of the content distribution system 100, according to one embodiment. The third configuration 100F of the content distribution system 100 is the same as the first configuration 100A of the content distribution system 100 except that the third configuration 100F includes three audio speakers $101_{1-3}$ instead of one audio speaker 101. In the third configuration 100F, the first audio speaker $101_1$ performs the same functions as the audio speaker 101 from the first configuration 100A. For example, the network connections 51, 55, 56, and 57 with the first audio speaker $101_1$ are the same in the third configuration 100F as in the first configuration 100A for the audio speaker 101. However, in the third configuration 100F, the first audio speaker $101_1$ is additionally connected to the second audio speaker $101_2$ through an eighth network connection 58 and connected to the third audio speaker $101_3$ through a ninth network connection 59. The eight network connection 58 is a network connection between the second transceiver 106D (e.g., a Bluetooth® transceiver) of the first audio speaker $101_1$ and the second transceiver 106D (e.g., a Bluetooth® transceiver) of the second audio speaker $101_2$. Similarly, the ninth network connection 59 is a network connection between the second transceiver 106D (e.g., a Bluetooth® transceiver) of the first audio speaker $101_1$ and the second transceiver 106D (e.g., a Bluetooth® transceiver) of the third audio speaker $101_3$. In other embodiments, the network connections 58, 59 may be a different type of network connection, such as a Wi-Fi connection.

In the third configuration 100F, the first audio speaker $101_1$ downloads a portion of the media file from the corresponding content server (see e.g., blocks 1020 and 1022 of FIG. 3B) and then transmits the downloaded portions to the second audio speaker $101_2$ using the eighth network connection 58 and to the third audio speaker $101_3$ using the ninth network connection 59, so that all three audio speakers $101_{1-3}$ may stream the media content to the user 10 simultaneously.

The first audio speaker $101_1$ may be configured as a primary device while the second and third audio speakers $101_2$, $101_3$ may be configured as secondary devices. The audio speakers $101_{1-3}$ may be configured as primary or secondary devices in a number of ways including voice commands from the user 10, control from the portable electronic device 205 using network connections such as the seventh network connection 57, or through inputs (not shown) on the audio speakers $101_{1-3}$, such as buttons or switches. Furthermore, when a command to play or alter media content, such as a voice command from the user 10 or a command sent from the portable electronic device 205 is given, the audio speaker 101 designated as the primary device can respond to those commands based on its designation as the primary audio speaker, so that the intent of the command is completed. On the other hand, the audio speakers 101 designated as secondary devices can ignore such commands based on their designation as secondary devices. For example, if the user 10 gives a command to play a song from a given content provider, then only the audio speaker 101 designated as the primary device will initiate communication to the first server 21 and the corresponding content server such as the first content server 23. The audio speakers $101_{2,3}$ designated as the secondary devices will then stream the media content received from the audio speaker $101_1$ designated as the primary device.

By having only one of the audio speakers 101 communicate to the first server 21 and the corresponding content server, such as the first content server 23, less of a burden is placed on the first server 21 and the corresponding content server relative to a configuration in which each of the audio speakers independently communicated to the first server 21 and the corresponding content server. Furthermore, many content providers limit the number of devices for which a user can simultaneously stream media content, so for some content providers an attempt to have multiple devices independently stream media content from the content provider simultaneously may not be successful. Furthermore, having multiple devices independently stream media content from a content provider may also burden the user's Internet connection. For example, in some embodiments, the user's Internet connection may not have enough bandwidth to independently stream media content to multiple devices, or there may not be enough bandwidth to independently stream the highest quality media content to the multiple devices. The third configuration 100F solves these problems by only having the primary device (e.g., the first audio speaker $101_1$) communicate to the content provider, such as the first content server 23, and then having the primary device transmit the media content downloaded from the content provider by the primary device to the secondary devices (e.g., the second audio speaker $101_2$ in the third audio speaker $101_3$)

While the foregoing is directed to embodiments of the present disclosure, other and further embodiments of the disclosure may be devised without departing from the basic scope thereof, and the scope thereof is determined by the claims that follow.

What is claimed is:

1. A method of transferring media content to one or more content players, the method comprising:
    receiving a first command at a first content player to deliver media content to a user of the first content player;
    transmitting at least a portion of the first command from the first content player to a first server;
    determining, at the first server, that the at least a portion of the first command is a request to deliver media content from a first content provider;
    transmitting a first request to a first content server of the first content provider from the first server based on the determined request to deliver the media content from the first content provider;
    receiving, at the first server, a first information link from the first content server in response to the first request;
    transmitting the first information link, from the first server, to the first content player;
    downloading a first portion of a first media file to the first content player from the first content server using the first information link;
    delivering, directly from the first content player, at least a portion of the first media file to the user;
    determining that a connection between the first content server and the first content player is no longer available; and
    downloading a second portion of the first media file to the first content player from the first content server through a portable electronic device in response to determining that the connection between the first content server and the first content player is no longer available, wherein the download of the first portion of the first media file occurred without use of the portable electronic device.

2. The method of claim 1, wherein the first command is a voice command from a user.

3. The method of claim 2, wherein determining, at the first server, that the first command is a request to deliver media content to the user from the first content provider comprises parsing the voice command into text, wherein the text includes an identifier of the first content provider.

4. The method of claim 2, wherein determining, at the first server, that the first command is a request to deliver media content to the user from the first content provider comprises receiving parsed text from a second server, wherein the second server converted the first command into the parsed text.

5. The method of claim 1, wherein the portable electronic device is connected to the first content server using a cellular connection.

6. The method of claim 1, wherein a first transceiver of the first content player is used to download the first portion of the first media file and a second transceiver of the first content player is used to download the second portion of the first media file.

7. The method of claim 1, further comprising:
    determining that a connection between the first content server and the first content player is available without use of the portable electronic device; and
    downloading a third portion of the first media file from the first content server without use of the portable electronic device, wherein downloading the third portion occurs after downloading the second portion.

8. The method of claim 1, further comprising:
    delivering at least part of the first portion of the first media file from the first content player to the user before the download of the second portion begins; and
    delivering at least part of the second portion of the first media file from the first content player to the user without any interruption between the delivering of the first portion and the second portion of the first media file.

9. The method of claim 1, further comprising:
    transmitting the first portion of the first media file from the first content player to a second content player; and
    delivering the first portion of the first media file from the first content player and the second content player to one or more users simultaneously.

10. The method of claim 1, wherein the first command received at the first content player includes one or more keywords associated with the requested media content and the first request from the first server to the first content server includes the one or more keywords.

11. The method of claim 1, further comprising:
    receiving a second command at the first content player to deliver media content to a user of the first content player;
    transmitting at least a portion of the second command from the first content player to the first server;
    determining, at the first server, that the at least a portion of the second command is a request to deliver media content from a second content provider;
    transmitting a second request to a second content server of the second content provider from the first server based on the determined request to deliver the media content from the second content provider;
    receiving, at the first server, a second information link from the second content server in response to the second request;
    transmitting the second information link, from the first server, to the first content player;
    downloading a first portion of a second media file to the first content player from the second content server using the first information link; and
    delivering, directly from the first content player, at least a portion of the second media file to the user.

12. The method of claim 1, wherein the first portion of the first media file is downloaded to the first content player from the first content server using the first information link through a network connection other than a network connection through the first server.

13. A method of transferring media content to one or more content players, the method comprising:
receiving a first command, at a first content player, to deliver media content to a user of the first content player;
transmitting at least a portion of the first command from the first content player to a first server through a portable electronic device;
determining, at the first server, that the at least a portion of the first command is a request to play media content from a first content provider;
transmitting a first request to a first content server of the first content provider based on the determined request to deliver the media content from the first content provider;
receiving, at the first server, a first information link from the first content server in response to the first request;
transmitting the first information link from the first server to the portable electronic device;
downloading a first portion of a first media file to the first content player from the first content server based on the received first information link, wherein the first portion of the first media file is transferred to the portable electronic device and then transferred to the first content player from the portable electronic device;
delivering, directly from the first content player, at least a portion of the first media file to the user;
determining that a connection between the first content server and the first content player without use of the portable electronic device is available; and
downloading a second portion of the first media file to the first content player from the first content server without use of the portable electronic device in response to determining that the connection between the first content server and the first content player without use of the portable electronic device is available.

14. The method of claim 13, wherein the first command is a voice command from a user.

15. The method of claim 14, wherein determining at the first server that the first command is a request to deliver media content to the user from the first content provider comprises parsing the voice command into text, wherein the text includes an identifier of the first content provider.

16. The method of claim 14, wherein determining, at the first server, that the first command is a request to deliver media content to the user from the first content provider comprises receiving parsed text from a second server, wherein the second server converted the first command into the parsed text.

17. The method of claim 13, further comprising:
determining that the connection between the first content server and the first content player without use of the portable electronic device is no longer available; and
downloading a third portion of the first media file from the first content server to the first content player through the portable electronic device, wherein downloading the third portion occurs after downloading the second portion.

18. The method of claim 13, further comprising:
delivering at least part of the first portion of the first media file from the first content player to the user before the download of the second portion begins; and
delivering at least part of the second portion of the first media file from the first content player to the user without any interruption between the delivering of the first portion and the second portion of the first media file.

19. The method of claim 13, wherein a first transceiver of the first content player is used to download the second portion of the first media file and a second transceiver of the first content player is used to download the first portion of the first media file.

20. The method of claim 13, wherein the portable electronic device is connected to the first content server using a cellular connection.

21. The method of claim 13, further comprising:
transmitting the first portion of the first media file from the first content player to a second content player; and
delivering the first portion of the first media file from the first content player and the second content player to one or more users simultaneously.

22. The method of claim 13, wherein the first command received at the first content player includes one or more keywords associated with the requested media content and the first request from the first server to the first content server includes the one or more keywords.

23. The method of claim 13, further comprising:
receiving a second command, at the first content player, to deliver media content to a user of the first content player;
transmitting at least a portion of the second command from the first content player to the first server through the portable electronic device;
determining, at the first server, that the at least a portion of the second command is a request to play media content from a second content provider;
transmitting a second request to a second content server of the second content provider based on the determined request to deliver the media content from the second content provider;
receiving, at the first server, a second information link from the second content server in response to the second request;
transmitting the second information link from the first server to the portable electronic device;
downloading a first portion of a second media file to the first content player from the second content server based on the received second information link, wherein the first portion of the second media file is transferred to the portable electronic device and then transferred to the first content player from the portable electronic device; and
delivering, directly from the first content player, at least a portion of the second media file to the user.

24. The method of claim 13, wherein the first portion of the first media file is downloaded to the first content player from the first content server using the first information link through a network connection other than a network connection through the first server.

25. A method of transferring media content to one or more content players, the method comprising:
receiving a first command at a first content player to deliver media content to a user of the first content player;
transmitting at least a portion of the first command from the first content player to a first server;
determining, at the first server, that the at least a portion of the first command is a request to deliver media content from a first content provider;
transmitting a first request to a first content server of the first content provider from the first server based on the determined request to deliver the media content from the first content provider;

receiving, at the first server, a first information link from the first content server in response to the first request;

transmitting the first information link, from the first server, to the first content player;

downloading a first portion of a first media file to the first content player from the first content server using the first information link;

delivering, directly from the first content player, at least part of the first portion of the first media file to the user;

determining that a connection between the first content server and the first content player is no longer available;

downloading a second portion of the first media file to the first content player from the first content server through a portable electronic device in response to determining that the connection between the first content server and the first content player is no longer available, wherein
 the download of the first portion of the first media file occurred without use of the portable electronic device, and
 the portable electronic device is connected to the first content server using a cellular connection; and delivering, directly from the first content player, at least part of the second portion of the first media file to the user.

* * * * *